Figure 1:
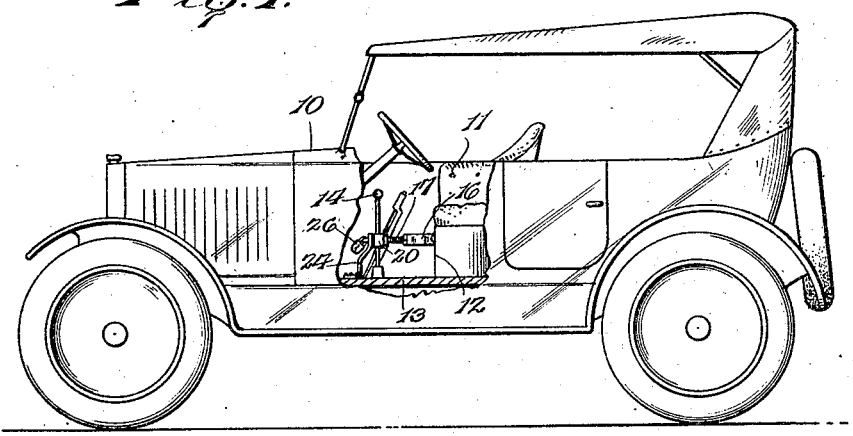

May 20, 1924.　　　　　D. G. SELL　　　　　1,494,717

GEAR SHIFT LEVER LOCK

Filed July 7, 1922

Inventor
D. G. Sell.

By Lacey & Lacey, Attorneys

Patented May 20, 1924.

1,494,717

UNITED STATES PATENT OFFICE.

DAVID G. SELL, OF NEAR HANOVER, PENNSYLVANIA.

GEAR-SHIFT-LEVER LOCK.

Application filed July 7, 1922. Serial No. 573,281.

*To all whom it may concern:*

Be it known that I, DAVID G. SELL, citizen of the United States, residing near Hanover, in the county of Adams and State of Pennsylvania, have invented certain new and useful Improvements in Gear-Shift-Lever Locks, of which the following is a specification.

This invention relates to an improved gear shift lever lock for motor vehicles and seeks, as one of its principal objects, to provide a device of this character whereby movement of the gear shift lever of a vehicle may be readily prevented to thus, in turn, prevent the unauthorized use of the vehicle.

The invention has as a further object to provide a device which may be readily applied and which will be well adapted for use in connection with motor vehicles of different makes.

And the invention has as a still further object, to provide a device which may be adjusted to meet the requirements of different vehicles.

Other and incidental objects will appear hereinafter.

Figure 2:
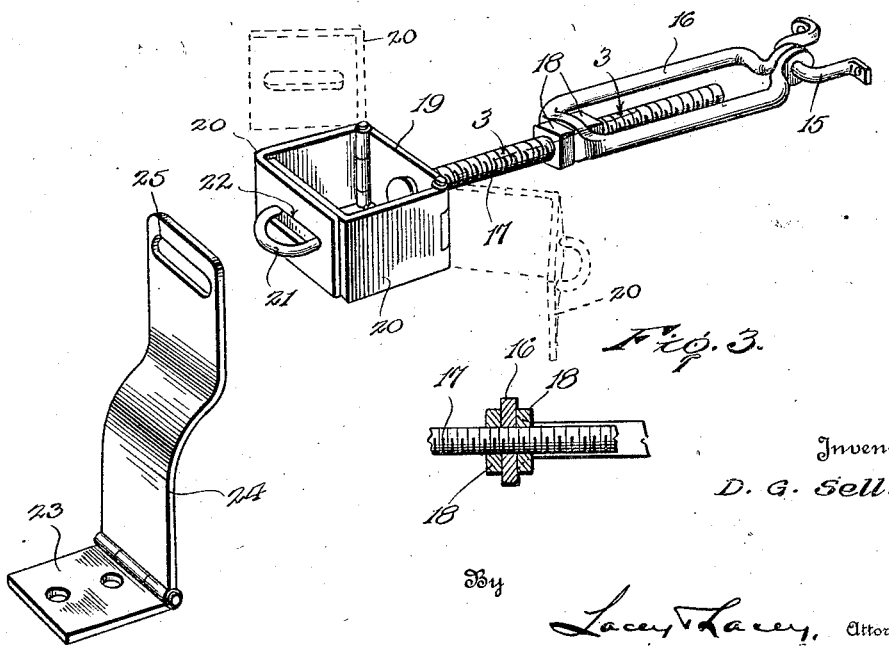

In the drawing:

Figure 1 is a side elevation partly broken away and showing my improved locking device in connection with a conventional motor vehicle, Figure 2 is a detail perspective view of the device, and Figure 3 is a fragmentary sectional view on the line 3—3 of Figure 2.

Referring now more particularly to the drawing, I have, for convenience, shown my improved locking device in connection with a conventional motor vehicle 10. The front seat of the vehicle is indicated at 11 and beneath said seat is the usual counter 12. The floor boards are indicated 13 and upstanding with respect to the floor boards in spaced relation to the front seat is the usual gear shift lever 14.

In carrying the invention into effect, I employ a bracket 15 which is bolted or otherwise permanently secured at its ends to the counter 12 of the vehicle and mounted upon said bracket is a split link 16. The ends of this link are apertured to freely receive the bracket therethrough so that the link is thus pivotally connected to the bracket and threaded through the forward end of the link, as shown in detail in Figure 3, is a rod 17. Threaded upon the rod to engage the link at its inner and outer sides are lock nuts 18. Fixed against rotation upon the forward end of the rod is a lever engaging collar including a back plate 19 secured to the rod and hinged upon said plate at its ends are mating angle shaped side plates 20. Fixed to the free end of one of said plates is a loop 21 and formed in the other of said plates is a slot 22 to freely accommodate the loop. Permanently secured to the floor boards 13 of the vehicle in advance of the lever 14 is a plate 23 and hinged to said plate is a hasp 24 provided at its free end with a slot 25 to receive the loop 21 of the collar therethrough. In conjunction with this loop I employ an appropriate padlock 26.

As will now be understood in view of the preceding description, the side plates of the collar upon the rod 17 may, as suggested in Figure 2, be swung outwardly when the collar may be readily engaged around the lever 14. This done, the hasp 24 is fitted over the loop when the lock 26 is engaged through the loop for securing the collar about the lever. Thus, the device will prevent movement of the lever to, in turn, prevent unauthorized use of the vehicle. As will be perceived, the hasp 24 will support the collar spaced above the lower end of the lever so that the collar cannot be shifted downwardly to permit movement of the lever while the rod 17 and link 16 will hold the lever against forward or rearward movement. Further, it is to be noted that the connection between the bracket 15 and link 16 is such that the link can not be rotated upon the bracket to disengage the link and rod and since the collar is fixed upon the rod, the collar will lock the rod against rotation. Accordingly, separation of the link and rod to release the lever will be prevented. However, adjustment between these parts is provided so that the effective length of the rod may be varied to meet the requirements of different vehicles and, of course, the nuts 18 are employed for locking the rod in adjusted position. I accordingly provide a particularly simple and effective device for the purpose set forth and, as will now be appreciated, a device well adapted for use in connection with substantially any conventional make of motor vehicles.

Having thus described the invention, what is claimed as new is:

In a gear shift lever locking device for motor vehicles, the combination of a bracket for connection to the vehicle, an oblong link split at one end thereof and having its sides apertured at their free ends to receive the bracket therethrough swingingly connecting the link with the bracket but limited against rotation thereon, a rod screwed through the outer end of the link and adjustable thereon, nuts on the rod to abut opposite faces of the link locking the rod in adjusted position, a back plate fixed against rotation upon the outer end of said rod, angle shaped side plates swingingly mounted upon the ends of said back plate and adapted to embrace a gear shift lever, one of said side plates being provided with a loop and the other with a slot to receive said loop, a floor plate for attachment to the floor boards of the vehicle, a hasp hinged upon said floor plate and provided with a slot to accommodate said loop limiting said side plates against movement along the lever, and a lock to engage through the loop securing the hasp thereto as well as securing the side plates about the lever.

In testimony whereof I affix my signature.

DAVID G. SELL. [L. S.]